3,313,790
NOVEL INTERPOLYMERS
Massimo Baer, Longmeadow, Mass., assignor to Monsanto Company, St. Louis, Mo., a corporation of Delaware
No Drawing. Filed Nov. 26, 1963, Ser. No. 326,234
8 Claims. (Cl. 260—80.5)

This invention relates to novel terpolymeric systems. More particularly, it relates to novel interpolymers of an ethylenically unsaturated nitrile, a vinylidene aromatic compound, and N-tertiarybutylacrylamide.

Acrylonitrile homopolymers are characterized by their poor flow properties as well as by their poor thermal stability as evidenced by a glass transition temperature of about 98° C. and a decomposition temperature by thermogravimetric analysis of 285° C. Copolymers of styrene and acrylonitrile are now widely used, providing polymeric systems possessing the desirable characteristics of acrylonitrile while avoiding, to at least a substantial degree, the poor flow and thermal deficiencies of acrylonitrile. However, even these styrene/acrylonitrile copolymers suffer from relatively low heat distortion and glass transition temperatures; i.e., about 98° C. and 118° C. respectively, on a 50/50 by weight copolymer.

It is an object of this invention to provide novel interpolymers containing acrylonitrile or methacrylonitrile and possessing an unpredictable and unusual combination of high glass temperature and good thermal stability.

Another object is the provision of novel interpolymers containing acrylonitrile or methacrylonitrile for use as polymeric components in polyblends.

A further object is the provision of a novel process for the preparation of homogeneous interpolymers containing acrylonitrile or methacrylonitrile.

These and other objects are attained through the interpolymerization of an ethylenically unsaturated nitrile, a vinylidene compound and N-tertiary-butylacrylamide.

The following examples are given in illustration of the invention and are not intended as limitations thereon. In each instance the reaction vessel employed is a three-liter round flask equipped with a thermowell and three necks, one neck being fitted with an agitator, another neck being fitted with a reflux condenser and thermometer and the third neck being fitted with a "U" tube having two graduated funnels.

EXAMPLE I

The reaction vessel is charged with about 1000 ml. of distilled water, 6 grams, on a solids basis, of Triton X-200 (the sodium salt of a sulfonated alkylaryl polyether alcohol). The system is heated to reflux and maintained thereat, under a nitrogen atmosphere which is maintained throughout the polymerization, for 15 minutes to degas the system. The temperature is adjusted to about 85° C. and the pH is adjusted to about 3.5 using a 1.36% solution of $KH_2PO_4$ in water. 30 grams of monomer mixture A, consisting of about 71 parts by weight of acrylonitrile, 2.5 parts by weight of styrene and 26 parts by weight of N-tertiary-butylacrylamide, are charged. As soon as exothermy indicates that polymerization has started, streams of the following components are continuously charged at a substantially uniform rate over a period of 1.5 hours:

(a) 200 grams of a warm monomer mixture, B, consisting of about 100 parts by weight of acrylonitrile, 50 parts by weight of styrene and 50 parts by weight of N-tertiary-butylacrylamide;
(b) 62 grams of a 1 weight percent solution of potassium persulfate.

Upon completion of addition of the above components, polymerization is quenched by rapidly cooling the reaction mixture in a Dry Ice-acetone bath to about 5° C. Residual monomers and water are separated by freezing the reaction mixture to about −30° C. overnight. After thawing, the polymeric solids are repeatedly washed with hot water and then with methanol. Upon drying, the product is found to be a solid, white, substantially homogeneous interpolymer (50:25:25) of acrylonitrile/styrene/N-tertiary-butylacrylamide. The intrinsic viscosity of the interpolymer is found to be about 1.31 deciliters/gram in dimethylformamide.

EXAMPLE II

Example I is repeated, substituting as monomer mixture A, 25 grams of a mixture of about 54 parts by weight of acrylonitrile, 23 parts by weight of styrene and 23 parts by weight of N-tertiary-butylacrylamide and further substituting as monomer mixture B, 200 grams of a mixture of about 50 parts by weight of acrylonitrile, 100 parts by weight of styrene and 50 parts by weight of N-tertiary-butylacrylamide. The product is found to be a solid, white, substantially homogeneous interpolymer (25:50:25) of acrylonitrile/styrene/N-tertiary-butylacrylamide. The intrinsic viscosity of the interpolymer is found to be about 2.71 deciliters/gram in dimethylformamide.

EXAMPLE III

Example I is repeated, substituting as monomer mixture A, 50 grams of a mixture of about 60 parts by weight of acrylonitrile, 14 parts by weight of alphamethylstyrene and 26 parts by weight of N-tertiary-butylacrylamide and further substituting as monomer mixture B, 200 grams of a mixture of 50 parts by weight of acrylonitrile, 100 parts by weight of alphamethylstyrene and 50 parts by weight of N-tertiary-butylacrylamide. The product is found to be a solid, white, substantially homogeneous interpolymer (25:50:25) of acrylonitrile/alphamethylstyrene/N-tertiarybutylacrylamide. The intrinsic viscosity of the interpolymer is found to be about 1.07 deciliters/gram in dimethylformamide.

EXAMPLE IV

Example I is repeated, substituting as monomer mixture A, 25 grams of a mixture of about 71 parts by weight of acrylonitrile, 2.5 parts by weight of alphamethylstyrene and 26 parts by weight of N-tertiary-butylacrylamide and further substituting as monomer mixture B, 200 grams of a mixture of 101 parts by weight of acrylonitrile, 58 parts by weight of alphamethylstyrene and 42 parts by weight of N-tertiary-butylacrylamide. The product is found to be a solid, white, substantially homogeneous interpolymer (50:29:21) of acrylonitrile/alphamethylstyrene/N-tertiary-butylacrylamide. The intrinsic viscosity of the interpolymer is found to be about 1.03 deciliters/gram in dimethylformamide.

EXAMPLE V

Example I is repeated substituting methacrylonitrile for the acrylonitrile employed in monomer mixtures A and B thereof. The product is found to be a solid, white, substantially homogeneous interpolymer of methacrylonitrile/styrene/N-tertiary-butylacrylamide.

EXAMPLE VI

In a manner similar to Example I, substantially homogeneous interpolymers of acrylonitrile and styrene and of acrylonitrile and N-tertiary-butylacrylamide are prepared for comparative purposes to demonstrate the significantly improved glass transition temperatures and thermal stability of the terpolymers of this invention. The products are described in Table A, infra.

As further comparison, high molecular weight i.e., intrinsic viscosity in excess of 1.0 deciliter/gram in dimethylformamide, homopolymers of styrene and of N-tertiary-butylacrylamide are obtained. Also, a high molecular weight homopolymer of acrylonitrile is prepared as in Example I.

Each of the interpolymers of Examples I–VI as well as the homopolymers of the individual monomers is evaluated with respect to their glass transition temperature, (Tg), their heat distortion temperatures and their decomposition temperatures. The decomposition temperatures reported are obtained by thermogravimetric analysis under a vacuum to 2 mm. of mercury with a 6° C./min. temperature rise. The Tg reported are obtained by means of a dynamic torsion pendulum.

TABLE A

| Ex. No. | Interpolymer Composition* | Tg (° C.) | Heat Distortion (° C.) | Decomposition Temp. (° C.) |
|---|---|---|---|---|
| I | 50 AN/25 S/25 BuANH | 140 | 115 | 385 |
| II | 25 AN/50 S/25 BuANH | | 115 | |
| III | 25 AN/50 αMS/25 BuANH | 140 | 120 | 380 |
| IV | 50 AN/29 αMS/21 BuANH | | 110 | |
| VIA | 50 AN/50 S | 118 | 98 | 385 |
| VIB | 75 AN/25 S | 115 | | 360 |
| VIC | 65 AN/35 BuANH | 127 | | 320 |
| VID | 75 AN/25 BuANH | 120 | | 316 |
| | AN homopolymer | 98 | | 285 |
| | S homopolymer | 110 | 95 | 400 |
| | BuANH homopolymer | 142 | | 347 |

*AN refers to acrylonitrile, S refers to styrene, αMS refers to alphamethylstyrene, BuANH refers to N-tertiary-butylacrylamide.

Careful study of Table A reveals an unusual characteristic of the interpolymers of this invention. The glass temperature (Tg) of an interpolymer is commonly computed by a Lashaek-Fox relationship; cf. Lashaek, S. and Fox, T. G., Bull. Amer. Physical Society, 1, 123, (1956).

$$\frac{1}{TG} = \frac{W_1}{Tg_1} + \frac{W_2}{Tg_2} + \frac{W_3}{Tg_3}$$

wherein $W_1$, $W_2$ and $W_3$, are, respectively, the weight fractions of the several monomeric components and $Tg_1$, $Tg_2$ and $Tg_3$ are respectively, the glass temperatures in degrees Kelvin of the homopolymers of the respective monomeric components. Upon examination of Table A, however, it is seen that the interpolymers of this invention possess glass transition temperatures significantly above the expected values and, in fact, as good as that of the homopolymer N-tertiary-butylacrylamide, which has the highest Tg of the several monomeric components. Comparison with Examples VIB and VID shows that neither acrylonitrile/styrene alone nor acrylonitrile/N-tertiary-butylacrylamide alone is capable of raising the Tg to such unusually high levels. It should also be noted that there is no adverse effect on the decomposition temperature despite the fact that one would expect a reduction in thermal stability due to the presence of N-tertiary-butylacrylamide. As can be seen, the N-tertiary-butylacrylamide does depress the thermal stability, i.e., decomposition temperature, of the acrylonitrile/N-tertiary-butylacrylamide copolymer, but does not in the interpolymers of this invention.

The interpolymers of this invention are interpolymers of (a) acrylonitrile or methacrylonitrile, or a mixture thereof, (b) one or more vinylidene aromatic compounds, and (c) N-tertiary-butylacrylamide.

The vinylidene aromatic compounds employed in the practice of this invention are most usually styrene or alphamethylstyrene. However, equivalent results are obtained using in place thereof substituted alkylstyrenes such as, e.g., ortho-, meta- and para-methylstyrenes, 2,4-dimethylstyrene, para-ethylstyrene, etc.; substituted halostyrenes such as, e.g., alphachlorostyrene, 2,4-dichlorostyrene, ortho-, meta- and para-chlorostyrenes or bromostyrenes, etc.; and substituted alkyl halo styrenes such as, e.g., 2-methyl-4-chlorostyrene, etc. Mixtures of such vinylidene aromatic compounds may be used. The alkyls are generally from 1 to 4 carbons and may include, in addition to those shown above, isopropyl, isobutyl, etc.

The terpolymers may be comprised of the foregoing monomeric compounds in virtually any proportion. However, in a preferred embodiment the terpolymers will be comprised of from about 15 to 70, and more preferably from about 25 to 50, weight percent of the nitrile monomer, from about 20 to 60, and more preferably from about 25 to 50, weight percent of the vinylidene aromatic compound and from about 20 to 50, and more preferably from about 15 to 35, weight percent of N-tertiary-butylacrylamide.

The novel terpolymers of this invention may be manufactured by well known techniques, for example, by mass polymerization, by emulsion or suspension polymerization, etc. Proper polymerization conditions require an acidic media having a pH from about 2 to 6 and preferably from about 3 to 4. Such pH may be obtained through addition of any soluble acid, for example, hydrochloric acid, nitric acid, phosphoric acid, sulphuric acid, sulphurous acid, potassium hydrogen phosphate, etc. In aqueous media the pH is most conveniently adjusted using an aqueous solution of sulphur dioxide.

Any free radical generating catalyst may be used in the practice of this invention. Typical of such catalysts are the peroxide catalysts, actinic radiation, etc. Such will be obvious to those skilled in the art and this invention shall not be limited in this regard. Temperature is of importance only as regards the generation of free radicals and is generally adjusted to effect interpolymerization within reasonably short periods of time without letting the reaction rate become uncontrollable. Temperatures of from about −20° C. to 250° C. and preferably from about 25° C. to 150° C. are not unusual.

In a preferred embodiment substantially homogeneous terpolymers may be prepared by emulsion polymerization in an aqeous media using a conventional emulsifying agent. Maximum homogeneity of the product is obtained as portrayed in the examples by charging an initial monomer mixture of the several monomers combined in proportions calculated to approximate those of the kettle charge at equilibrium for the desired polymer composition. After polymerization is initiated a continuous or semi-continuous stream of monomer mixture in proportions substantially the same as the composition of the interpolymer prepared will serve to maintain these equilibrium proportions.

The novel terpolymers of this invention are useful per se as molding materials in the manufacture of tough shaped articles having high tensile and impact strength. For example, they are useful as refrigerator components such as interior linings and shelves, as vacuum cleaner components such as the vacuum cleaner housing or the accessory tools, as automotive components such as medallions, trim, etc., as communications and business machine components, etc. In other embodiments the novel terpolymers of this invention may be similarly modified by the incorporation of additives such as dyes, pigments, stabilizers, plasticizers, fillers, extenders, etc. They may be used alone or in polyblends as described above as well as in comixtures with other thermoplastic or thermosetting compositions.

It is obvious that many variations may be made in the products and processes set forth above without departing from the spirit and scope of this invention.

What is claimed is:
1. A random interpolymer of (a) from about 25 to 50 weight percent of a nitrile selected from the class consisting of acrylonitrile and methacrylonitrile, (b) from about 15 to 35 weight percent of N-tertiary-butylacrylamide, and (c) from about 25 to 50 weight percent of a vinylidene aromatic compound selected from the class consisting of styrene, alphamethylstyrene, alphahalostyrenes, aryl-substituted halo and lower alkyl styrenes, and mixtures thereof; the total of (a), (b) and (c) being 100% by weight; said interpolymer having a glass temperature (Tg) substantially higher than that predicted by the Lashaek-Fox equation.

2. An interpolymer as in claim 1 wherein the styrene compound is styrene.

3. An interpolymer as in claim 2 wherein the nitrile is acrylonitrile.

4. An interpolymer as in claim 2 wherein the nitrile is methacrylonitrile.

5. An interpolymer as in claim 1 wherein the styrene compound is alphamethylstyrene.

6. An interpolymer as in claim 5 wherein the nitrile is acrylonitrile.

7. An interpolymer as in claim 5 wherein the nitrile is methacrylonitrile.

8. A process for preparing the interpolymers of claim 1 which comprises (a) charging a reaction vessel with a mixture of nitrile, a vinylidene aromatic compound and N-tertiary-butylacrylamide in proportions approximating those of the equilibrium reaction mixture for an interpolymer of the desired relative monomeric proportions, (b) initiating polymerization and (c) thereafter at least incrementally charging a mixture of a nitrile, a vinylidene aromatic compound and N-tertiary-butylacrylamide in proportions approximating the desired relative monomeric proportions of the interpolymer; said nitrile being selected from the class consisting of acrylonitrile and methacrylonitrile and said vinylidene aromatic compound selected from the calss consisting of styrene, alphamethylstyrene, alpha-halostyrenes, aryl-substituted halo and lower alkyl styrenes, and mixtures thereof.

References Cited by the Examiner

UNITED STATES PATENTS 2,646,417   7/1953   Jennings _____ 260—80.5
2,798,868   7/1957   Miller _____ 260—85.5

OTHER REFERENCES

"The Chemistry of Acrylonitrile," 2nd edition, American Cyanamid Co., New York (1959), pp. 32–33 relied upon. (Copy in Group 140, QD 401A52.)

JOSEPH L. SCHOFER, *Primary Examiner.*

W. HOOVER, *Assistant Examiner.*